United States Patent
Heher et al.

(10) Patent No.: US 12,097,560 B2
(45) Date of Patent: Sep. 24, 2024

(54) BODY AND METHOD FOR LOCATING MACHINING FEATURES IN ADDITIVELY MANUFACTURED PARTS

(71) Applicant: Transportation IP Holdings, LLC, Norwalk, CT (US)

(72) Inventors: Brett Heher, Pittsburgh, PA (US); Manuel Licon Flores, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 266 days.

(21) Appl. No.: 17/314,297

(22) Filed: May 7, 2021

(65) Prior Publication Data

US 2022/0355383 A1 Nov. 10, 2022

(51) Int. Cl.
*B22F 10/66* (2021.01)
*B23B 35/00* (2006.01)
*B33Y 30/00* (2015.01)
*B33Y 40/20* (2020.01)

(52) U.S. Cl.
CPC ............. *B22F 10/66* (2021.01); *B23B 35/00* (2013.01); *B33Y 30/00* (2014.12); *B33Y 40/20* (2020.01)

(58) Field of Classification Search
CPC ...................................................... B22F 10/66
See application file for complete search history.

(56) References Cited

U.S. PATENT DOCUMENTS

| | | | |
|---|---|---|---|
| 6,109,839 A | 8/2000 | Thomas | |
| 8,300,983 B2 | 10/2012 | Pinault | |
| 9,047,338 B2 | 6/2015 | Rasmussen et al. | |
| 9,554,812 B2 | 1/2017 | Inkpen et al. | |
| 10,589,352 B2 | 3/2020 | Mark | |
| 2013/0180110 A1* | 7/2013 | Schechner | A61C 13/09 29/896.1 |
| 2018/0348738 A1* | 12/2018 | Jacobs, Ii | G05B 19/4099 |
| 2020/0338655 A1* | 10/2020 | Glimpel | B23G 5/20 |

FOREIGN PATENT DOCUMENTS

| | | |
|---|---|---|
| CN | 106623927 A | 5/2017 |
| EP | 3028839 A1 | 6/2016 |

OTHER PUBLICATIONS

Demos, K. (Apr. 11, 2019) mortise-and-tenon variations. FineWoodworking. https://www.finewoodworking.com/project-guides/joinery/11-mortise-and-tenon-variations (Year: 2019).*
Extended European Search Report mailed Oct. 31, 2022 for corresponding Application No. 22169721.2 (19 pages).

* cited by examiner

*Primary Examiner* — Jophy S. Koshy
*Assistant Examiner* — Joshua S Carpenter
(74) *Attorney, Agent, or Firm* — K&L Gates LLP

(57) ABSTRACT

A method includes forming one or more plug holes into a tool surface of a body. The one or more plug holes are partially formed around a landing surface portion of a plug in the body. The method also includes engaging a tool with the landing surface portion of the plug in the body, and using the tool to cut away the plug from the body and at least part of the body to form a tooled void into the body.

9 Claims, 6 Drawing Sheets

BODY AND METHOD FOR LOCATING MACHINING FEATURES IN ADDITIVELY MANUFACTURED PARTS

BACKGROUND

Technical Field

The subject matter described herein relates to locating a tool to machine features (such as threaded holes) into an additively manufactured part.

Discussion of Art

Additively manufactured parts or bodies may contain internal passages and/or cavities. These passages or cavities can be formed by removing material from the bodies after the bodies are additively manufactured using known machining operations. For example, a tap can be used to cut away part of an additively manufactured body to form an internal female threaded surface.

These machining operations can interface with existing internal passages and/or channels in the additively manufactured part. For example, internal passages of an additively manufactured part may terminate at a threaded National Pipe Taper (NPT) connection. Currently, these threads are not printed but are machined into the additively manufactured part after printing of the part. As another example, internal passages of an additively manufactured part may terminate at a gasket, O-ring, or similar sealing body. The sealing body may need to compress against a polished, machined, or ground surface. When the additively manufactured part is machined to form this surface, the machining tool (e.g., a drill bit or the like) removes material around the existing additively manufactured cavity.

It may be difficult or impossible to align the tool with the location for forming the threaded surface or sealing body surface. For example, forming the internal threaded surface or sealing body surface may require a rotating tool to be at least partially inserted into an opening formed in the additively manufactured part. As the rotating tool engages with the part, the tool may make intermittent contact with the part. The intermittent contact can create large vibrations and stress in the tool. As another example, if the centerline of the tool and the centerline of the opening in the part are not perfectly aligned, the tool may bend, thereby increasing force on the tool and misalignment of the cut surface.

A need exists for an improved method for aligning tools with additively manufactured parts and/or for additively manufactured bodies or features that align tools with the parts.

BRIEF DESCRIPTION

In one embodiment, a method includes forming one or more plug holes into a tool surface of a body. The one or more plug holes are partially formed around a landing surface portion of a plug in the body. The method also includes engaging a tool with the landing surface portion of the plug in the body, and using the tool to cut away the plug from the body and at least part of the body to form a tooled void into the body.

In another example, a device body includes a tool surface into which a tool hole is to be cut by a tool, and a plug that is defined by one or more plug holes partially extending around the plug. The one or more plug holes extend around a landing surface portion of the tool surface. The landing surface portion is configured for the tool to engage during cutting into the tool surface.

In another example, a device body includes a tool surface and a plug that is defined by one or more plug holes partially extending around the plug. The one or more plug holes extend around a landing surface portion of the tool surface. The plug is configured so that engagement of the landing surface portion with a tool and cutting the plug away from the body with the tool forms a tooled void in the body.

In another example, a device body includes a tool surface and a plug that is defined by one or more plug holes partially extending around the plug. The one or more plug holes extend around a landing surface portion of the tool surface. Engaging the landing surface portion with a tool to cut the plug away from the body with the tool forms a tooled void in the body.

In another example, a device body includes a tool surface, and a tooled void formed in the body. The tooled void is formed by cutting or removing material from the device body by engaging or directing a tool onto or toward a plug that is part of the device body and that is defined by one or more holes at least partially extending around a perimeter of the plug.

In another example, a device body includes a tool surface, and a plug that is defined by one or more plug holes partially extending around the plug. The one or more plug holes extend around a landing surface portion of the tool surface.

In another example, a device body includes a tool surface, and a plug that is defined by one or more plug holes partially extending around the plug. The one or more plug holes extend around a landing surface portion of the tool surface. The device body includes the tool surface, plug holes, and plug that are additively manufactured.

In another example, a system includes the device body and the tool, where the device body is positioned for being cut by the tool, and the plug has the landing surface portion oriented normal to a cutting path of the tool.

In another example, a method includes additively manufacturing a device body to have a plug partially surrounded by one or more plug holes formed into a tool surface of the body. The plug has a landing surface. The method also includes engaging a tool with the landing surface of the plug in the body, and using the tool to cut away the plug from the body and at least part of the body to form a tooled void into the body. The tool can be used to cut away the plug from the body and the at least part of body to form inner threads in the body.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to methods and bodies formed on additively manufactured parts that aid in aligning tools with the parts, which can center the tools and reduce chatter (e.g., vibrations) of the tools. The bodies engage or are engaged with the center of the tool (e.g., a drill bit, tap, or other rotary tool). The center of the tool is engaged until the tool cuts into the part and reaches a depth such that the outside diameter of the tool is engaged by the inner surfaces of the part to stabilize the tool. The methods and bodies described herein also allow for powder removal from the part after the cutting is complete.

Figure 1:
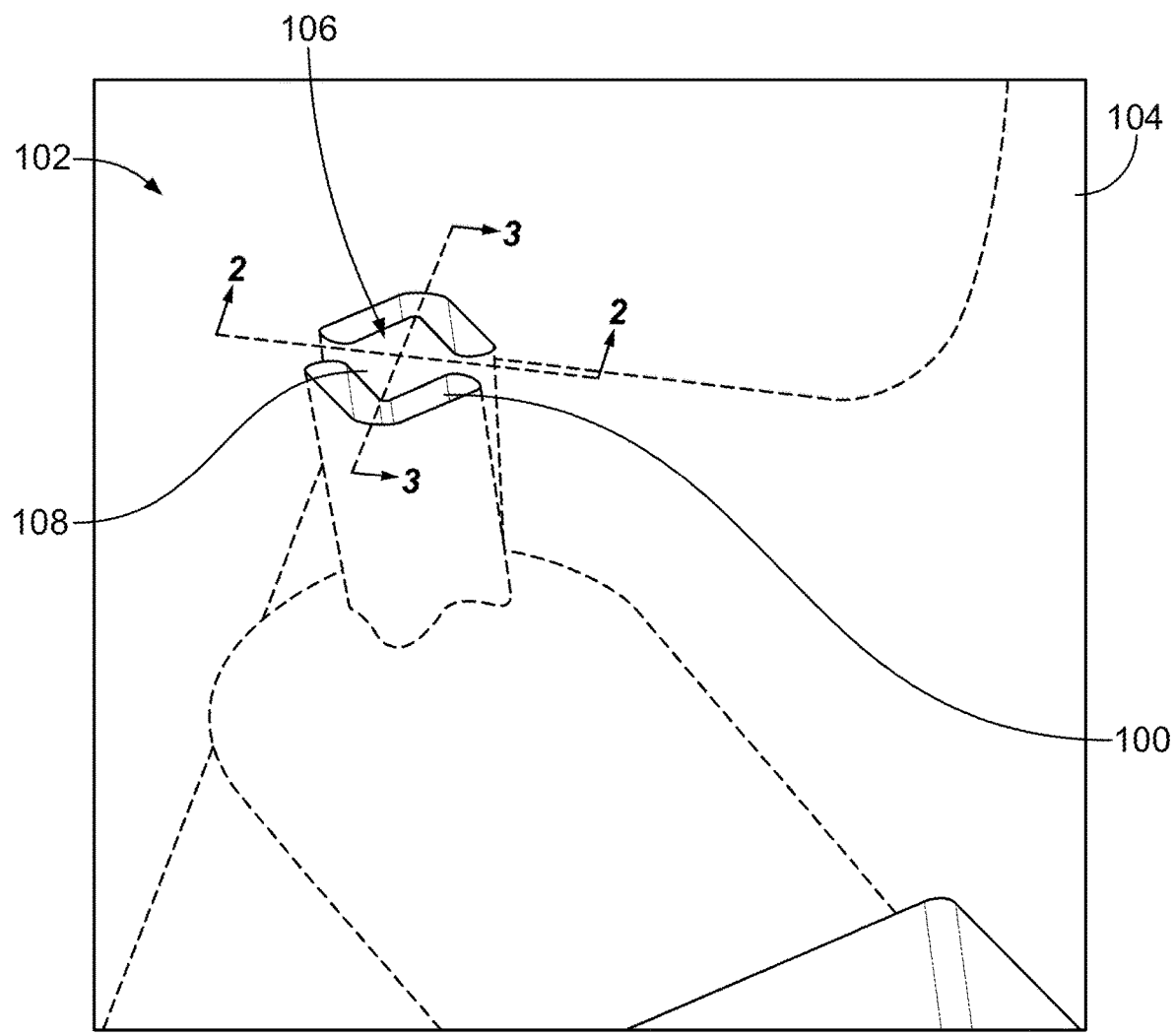
FIG. 1 illustrates one example of an additively manufactured device body.
Figure 3:
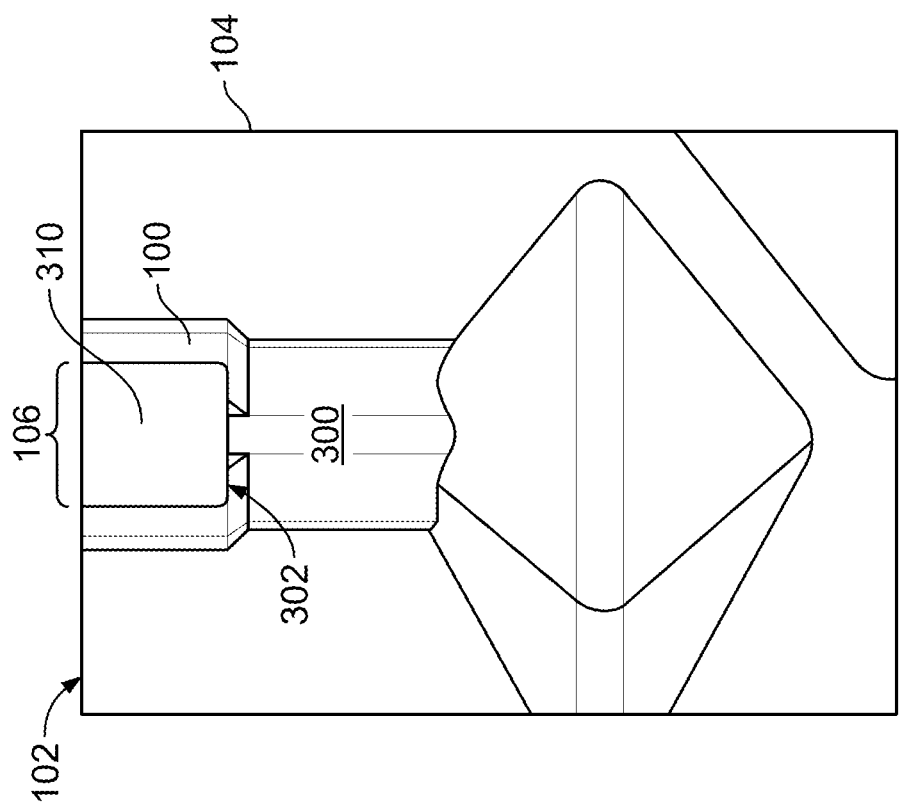
FIG. 3 is a second cross-sectional view of the device body along line 3-3 shown in FIG. 1.
Figure 2:
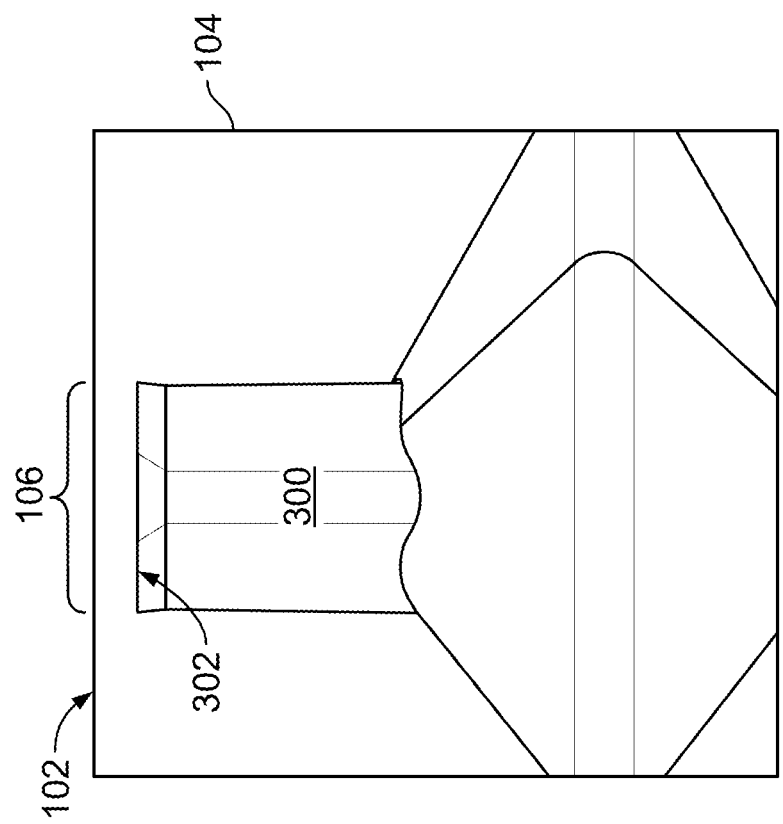
FIG. 2 is a first cross-sectional view of the device body along line 2-2 shown in FIG. 1.

FIG. 1 illustrates one example of an additively manufactured device body 104. FIG. 2 is a first cross-sectional view of the device body along line 2-2 shown in FIG. 1. FIG. 3 is a second cross-sectional view of the device body along line 3-3 shown in FIG. 1. The device body can be additively manufactured using three-dimensional printing, direct metal laser sintering, or the like. The device body can be formed from the same material or a combination of materials. The device body can be a homogenous body having a consistent formulation and density throughout all of the device body. For example, the relative amounts of or ratio of weights, volumes, or both weights and volumes of materials used to form the device body can be the same throughout all of the device body, regardless of the size or shape of any part of the device body. Alternatively, the device body can be a non-homogenous body with the relative amounts of or ratio of weights, volumes, or both weights and volumes of materials differs in different locations of the device body. The device body may be monolithic in that the body is formed as a single piece body and is not created by forming separate parts that are later joined together to form the device body. The monolithic aspect or nature of the device body can be identified or verified by an absence of any seams or interfaces between different parts that are joined together to form the device body. Alternatively, the device body may not be a monolithic body in that the body is formed as several separate pieces that are later joined together to form the device body. The non-monolithic aspect or nature of the device body can be identified or verified by seams or interfaces between different parts that are joined together to form the device body.

The device body can be formed from one or more of a variety of different materials. As one example, the device body can be formed from one or more polymers. Forming the device body from polymers can allow for the device body to have a variety of non-planar shapes. As described below, a plug can be formed in the device body to define a landing surface for a rotary tool. This landing surface may not be coplanar with another surface of the device body. Forming the device body and plug from polymers can allow for a wider variety of non-planar landing surfaces when compared with forming the device body and plug from other materials that are not polymers.

As another example, the device body can be formed from one or more metals, such as aluminum or steel. Forming the device body from metal can allow for the device body to dissipate heat more efficiently or quickly when compared to other materials (e.g., polymers). For example, forming the device body from aluminum can dissipate heat that created by cutting of the rotary tool into the plug more rapidly than if the device body were formed from polymers.

As another example, the device body can be a green body that is formed via additive manufacturing, but that is not yet sintered when the rotary tool cuts into the plug described below. Alternatively, the device body can be sintered before cutting the plug with the rotary tool.

The additive manufacturing process for forming the device body can involve sequentially constructing the device body layer by layer. Suitable processes include, for example, selective laser melting (or sintering) and binder jetting. Selective laser melting involves depositing a layer of powder on a build plate and fusing selective portions of the power using a ytterbium fiber laser that scans a computer aided design (CAD) pattern or file. Binder jetting creates a part by intercalating metal powder and polymer binding agent that bind the particles and layers together without the use of laser heating.

The device body includes a tool surface 102 into which a tool hole is to be cut by a rotary tool, such as a drill bit, tap, or the like. This surface may be an exterior surface of the device body or another surface. The tool surface includes one or more plug holes 100 that partially extend around and define a plug 310 (FIG. 3). The plug may be part of the device body that includes part of the tool surface and that extends into the interior of the device body.

Each of the plug holes is shown as two intersecting, elongated channels in an L-shape along the tool surface. Alternatively, the plug holes may have another shape and/or size. The plug holes partially extend around the plug and a portion of the tool surface, without completely extending around the plug. For example, the plug holes do not form any annular opening or channel extending into the device body, but may form part of an annular opening or channel. As shown in FIG. 3, the plug holes extend into the device body from the tool surface to an internal passage or conduit 300. The plug extends from the tool surface of the device body to an opposite end 302 that faces or is disposed within the internal passage or conduit of the device body. As shown in FIG. 2, the plug holes do not completely surround or encircle the plug and the plug can extend to or join with the remainder of the device body between the plug holes.

The portion of the tool surface that is exposed and partially surrounded by the plug holes is referred to as a landing surface portion 106 of the tool surface of the body. The landing surface portion is engaged by the tool during cutting into the tool surface. In the illustrated embodiment, the landing surface portion of the plug is coplanar with the tool surface. Alternatively and as described in more detail below, the landing surface portion may be parallel but not coplanar with the tool surface or may be transversely oriented (e.g., angled) with respect to the tool surface.

Figure 4:
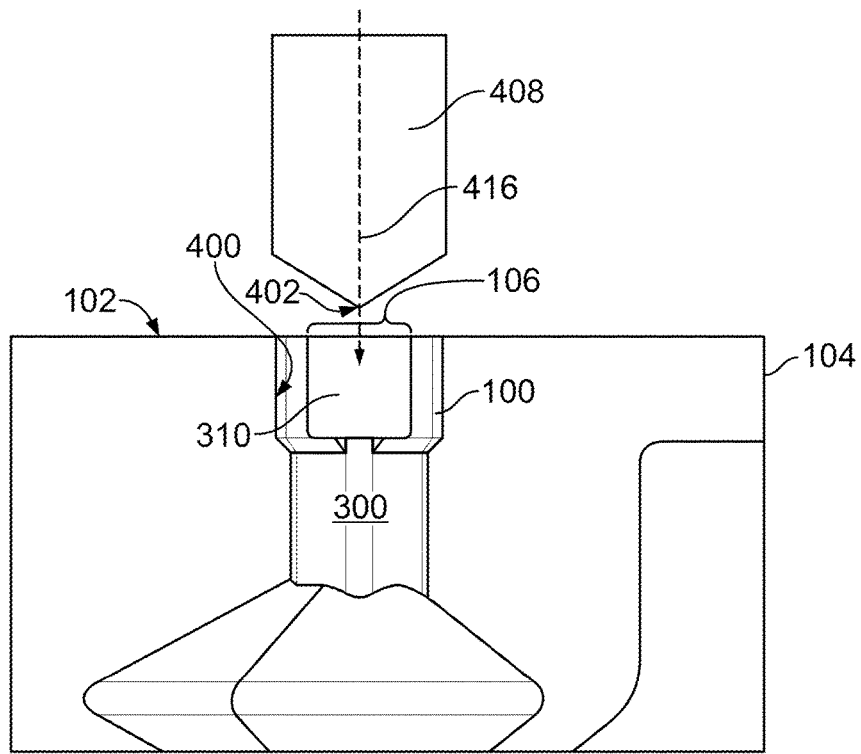
FIG. 4 illustrates another cross-sectional view of the device body along line 3-3 shown in FIG. 1 as a tool approaches the landing surface portion of the plug shown in FIG. 1 according to one example.
Figure 5:
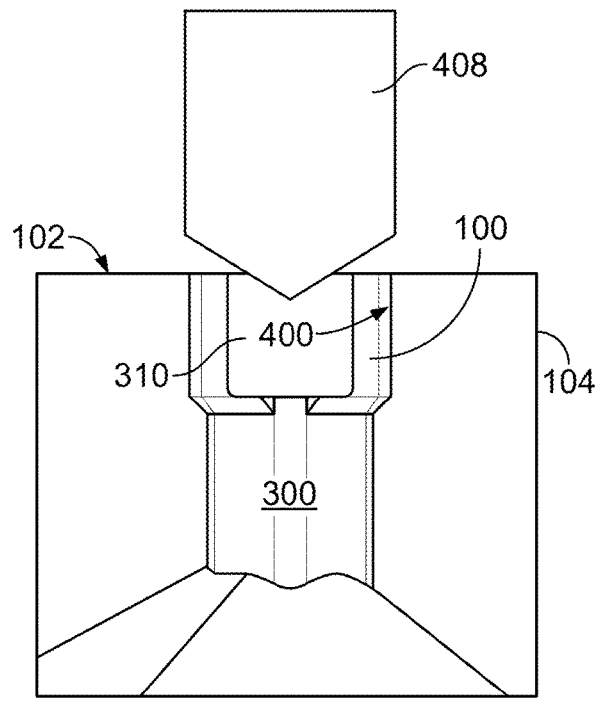
FIG. 5 illustrates another cross-sectional view of the device body along line 3-3 shown in FIG. 1 as the tool cuts into the plug according to one example.
Figure 6:
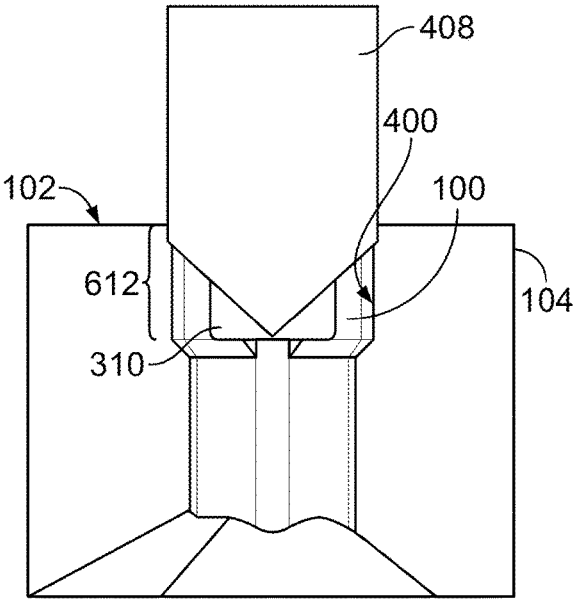
FIG. 6 illustrates another cross-sectional view of the device body along line 3-3 shown in FIG. 1 as the tool eliminates the plug and cuts into interior surfaces of the interior passageway of the device body.

FIG. 4 illustrates another cross-sectional view of the device body along line 3-3 shown in FIG. 1 as a tool 408 approaches the landing surface portion of the plug shown in FIG. 1 according to one example. FIG. 5 illustrates another cross-sectional view of the device body along line 3-3 shown in FIG. 1 as the tool cuts into the plug according to one example. FIG. 6 illustrates another cross-sectional view of the device body along line 3-3 shown in FIG. 1 as the tool eliminates the plug and cuts into interior surfaces 400 of the interior passageway 300 of the device body.

The tool shown in FIGS. 4 through 6 can represent a rotary tool, such as a drill bit, tap, or the like, that cuts away part of the device body. Alternatively, the tool may be another device that cuts away part of the device body (but without rotating). The tool may be elongated to an outer end or tip 402. The tool moves toward the landing surface portion of the device body along a cutting path 416 (and/or the device body moves toward the tool along the cutting path). The outer end or tip of the tool engages the landing surface portion of the plug in the device body. By engaging the plug before entering the passageway or channel 300 inside the device body, the tool does not intermittently contact interior surfaces 400 of the interior passageway or channel. Instead, the tip of the tool first engages and cuts into the plug, and maintains contact with the plug, as the tool cuts into the plug (FIG. 5) and through the plug (FIG. 6). The tool may eventually eliminate the plug entirely as the tool begins engaging the interior surfaces of the passageway or channel. For example, as the tool rotates to form threads or a smooth surface inside the device body, the tool may both cut away the plug and cut into the interior surfaces of the passageway or channel. The plug may be cut into smaller pieces or into a powder by the tool. These pieces or powder can then be removed from the passageway or channel (e.g., using compressed air or another fluid), or may be removed by threads in the tool during cutting. The volume within the device body that is formed by the tool may be referred to as a tooled void 612.

Figure 7:
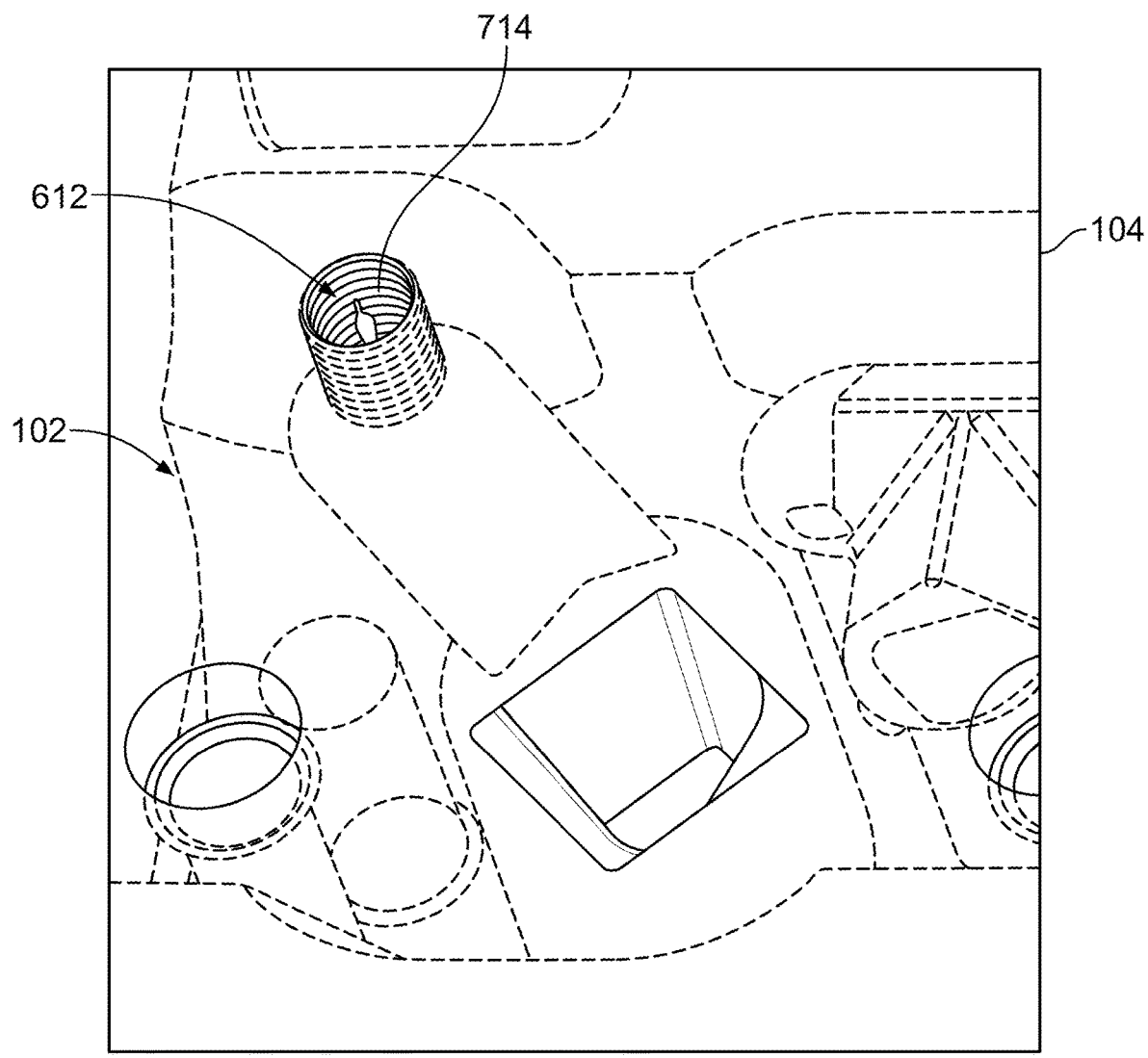
FIG. 7 illustrates one example of the device body with internal threads around the tooled void.

FIG. 7 illustrates one example of the device body with internal threads 714 around the tooled void. As shown by a comparison between the device body shown in FIG. 1 and in FIG. 7, the tool has cut away the plug to form the internal threads in the interior surfaces of the interior passageway or channel. These threads may be used to couple the device body with another body, channel, fastener, or the like that has matching threads.

In one example, the landing surface of the plug and/or the internal surfaces of the device body can include a material that differs from the material(s) from which the device body (and plug) are formed. This different material can facilitate cutting of the tool into the device body and plug. For example, the material along the landing surface can have greater adhesion to the tool to reduce the likelihood of (or prevent) slippage of the tool on the landing surface. The material along what will be the interior surfaces 400 of the void may have a lower coefficient of friction against the tool than the device body outside of the interior surfaces. This can assist in reducing the heat generated during cutting by the tool (and any damage to the device body caused by heat, such as melting of the device body).

Optionally, the tool may not be a rotary tool, but may be a punch tool that does not rotate while being driven into the device body to cut and form the void. As described above, the interior of the device body in locations where the interior surfaces will be located after the tool has cut into the device body can be formed from a different material than the rest of the device body (other than locations where other voids are to be cut or formed). With respect to the punch tool, the different material can be less dense and/or more brittle than the device body to allow the punch tool to more easily cut through this different material (relative to the other material (s) from which the device body is formed).

Optionally, the tool may not be a rotary tool, but may be a frictional drilling tool that is pressed into the plug and generates heat to melt (and remove) the plug to form the void. The material(s) used to form the plug can have a lower melting temperature than the rest of the device body (outside of locations where other voids are to be formed) to melt and remove the plug more easily when compared to the rest of the device body.

Optionally, the tool may be a laser that directs energy into the plug to remove the plug and form the void using laser ablation. The material(s) used to form the plug can have a lower melting temperature than the rest of the device body (outside of locations where other voids are to be formed) to melt and remove the plug more easily using laser ablation when compared to the rest of the device body.

Figure 8:
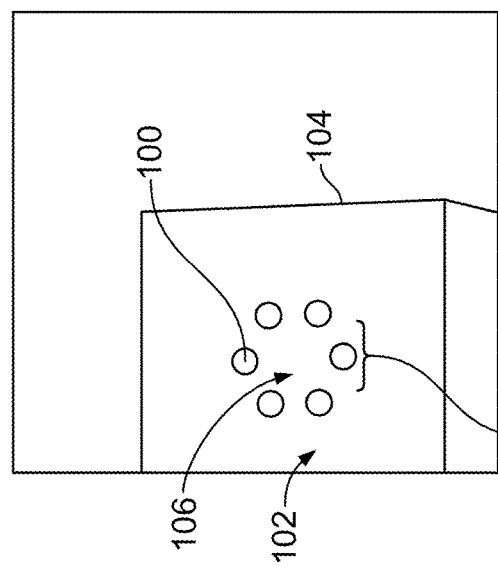
FIG. 8 illustrates another example of plug holes that may be formed in the device body.

FIG. 8 illustrates another example of plug holes 100 that may be formed in the device body. In contrast to the plug holes shown in FIG. 1, the plug holes shown in FIG. 8 are several circular holes arranged in a larger circle that extends around the plug. Alternatively, the plug holes may have another shape and/or be arranged in a shape around the plug (a shape other than a circle).

Figure 9:
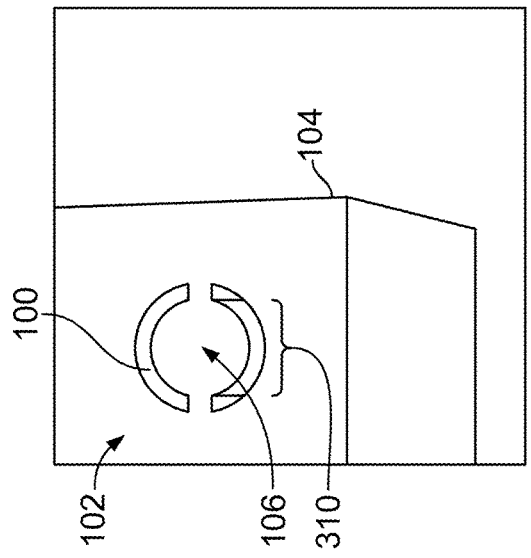
FIG. 9 illustrates another example of plug holes that may be formed in the device body.

FIG. 9 illustrates another example of plug holes 100 that may be formed in the device body. In contrast to the plug holes shown in FIGS. 1 and 8, the plug holes shown in FIG. 9 are elongated arcs that each partially forms just under one half of a circle (e.g., each arc forms no more than 40% of the circumference of a circle, each arc forms no more than 33% of the circumference of a circle, each arc forms no more than 49% of the circumference of a circle, etc.).

As shown in FIGS. 4 through 6, the landing surface portion of the plug may be normal to the cutting path of the tool. Stated differently, the tool may be directed toward the device body in a direction that is perpendicular to the landing surface portion of the plug. This landing surface portion also is coplanar with the surface of the device body that is outside of and surrounds the plug and plug holes, as shown in FIGS. 4 through 6.

Figure 10:
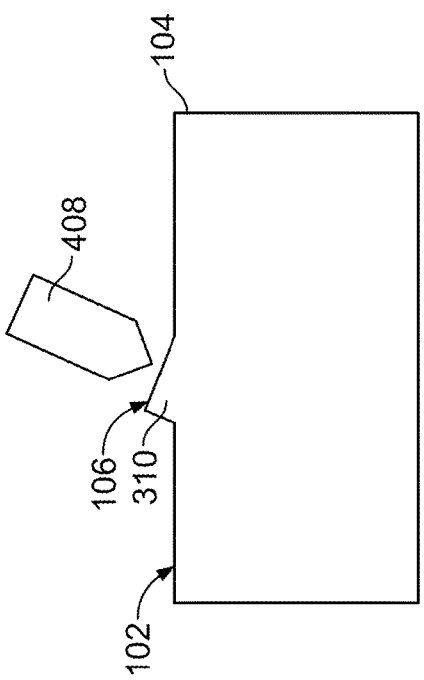
FIG. 10 illustrates an alternative embodiment of the plug in the device body.

FIG. 10 illustrates an alternative embodiment of the plug in the device body. As shown, the plug may have a landing surface portion that is not parallel to the tool surface of the device body, but that remains normal to the cutting path of the tool. The device body may be additively manufactured so that one side of the plug projects out from the tool surface of the device body more than at least one other side of the plug. This can cause the plug to be angled or askew relative to the surface of the device body. The angled plug can provide a landing surface that the tool can engage at an angle (e.g., for forming internal threads or smooth surfaces along an interior passageway that is angled or askew relative to the tool surface of the device body).

Figure 11:
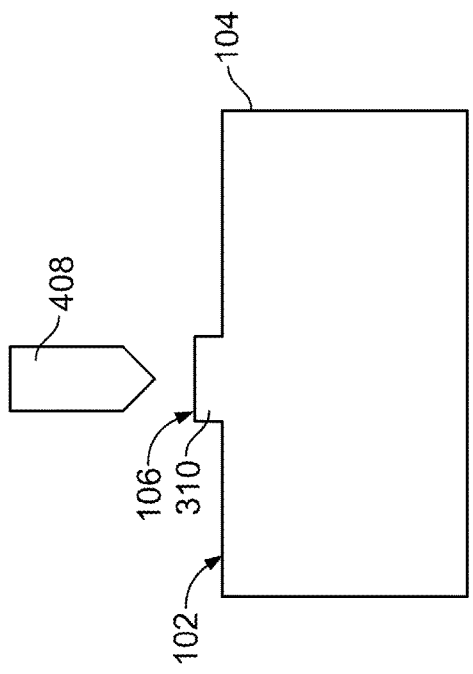
FIG. 11 illustrates an alternative embodiment of the plug in the device body.

FIG. 11 illustrates an alternative embodiment of the plug in the device body. As shown, the plug may have a landing surface portion that is parallel (e.g., not angled) to the tool surface of the device body, but that is not coplanar with the tool surface. The device body may be additively manufactured so that the plug projects out from the tool surface of the device body. This can provide a target area for the tool to engage. The plug holes may be disposed in the device body outside of the raised portion of the device body that forms the plug.

As described above, the device body and the plug can be additively manufactured as a single, monolithic body. The device body and plug can be printed from the same material, to have the same density, etc. Alternatively, the device body and plug can be additively manufactured as a single body, but with difference densities. For example, the density of the plug may be less than the density of the device body. Forming the plug to have a smaller density can require less material to be used to form the device body and plug, can result in less waste material being generated when the plug body is cut from the device body, etc.

Figure 12:
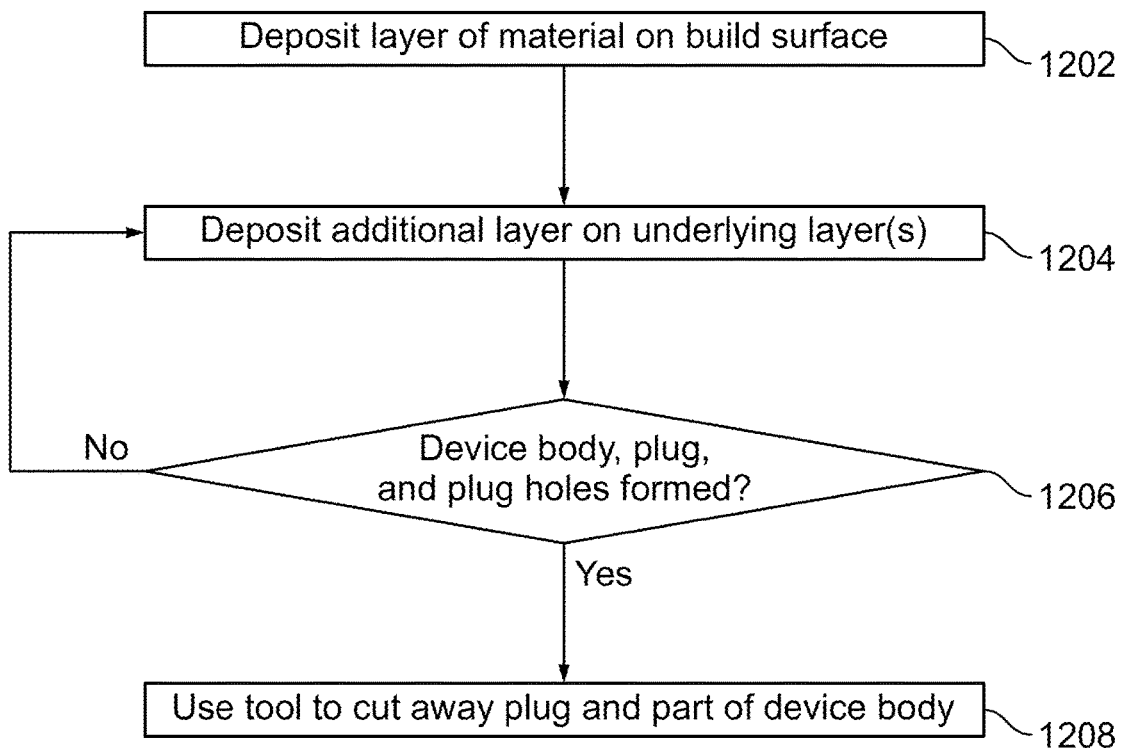
FIG. 12 illustrates a flowchart of one example of a method for locating machine features in an additively manufactured part.

FIG. 12 illustrates a flowchart of one example of a method 1200 for locating machine features in an additively manufactured part. The method can be used to form an additively manufactured device body such as the device body 104 described above. At 1202, a layer of material is deposited onto a build surface. For example, a base layer of the material from which the device body and plug will be formed can be deposited onto a surface using a three dimensional printer. At 1204, an additional layer of the material is deposited onto the underlying layer. At 1206, a decision is made as to whether the printing of the device body (with plug and plug holes) is complete. If the formation of the device body with plug and plug holes has not been completed, then flow of the method can return toward 1204 for one or more additional layers to be successively printed on the underlying layer(s) until the device body, plug, and plug holes are formed. Once printing of the device body, plug, and plug holes is complete, flow of the method can proceed toward 1208. At 1208, a tool may be used to cut away the plug and optionally form a smooth surface and/or threaded surface inside the device body. For example, a drill bit, tap, or the like, may be used to engage and cut away the plug from the device body, as described above. The plug and plug holes help to locate the tool on the device body and engage the tool before the tool begins engaging interior surfaces of the device to reduce stress on the tool and reduce or eliminate chatter or vibration of the tool during cutting.

In one embodiment, a method includes forming one or more plug holes into a tool surface of a body. The one or more plug holes are partially formed around a landing surface portion of a plug in the body. The method also includes engaging a tool with the landing surface portion of the plug in the body, and using the tool to cut away the plug from the body and at least part of the body to form a tooled void into the body.

Optionally, the one or more plug holes can be formed into the body during additive manufacturing of the body. The tool can be used to cut away the plug from the body and the at least part of body to form inner threads in the body. Using the tool to cut away the plug can include cutting into the plug with the tool before cutting away the at least part of the body.

The tool can be engaged with the landing surface portion that is coplanar with the tool surface. Alternatively, the tool can be engaged with the landing surface portion that is parallel, but not coplanar, with the tool surface. In another example, the tool can be engaged with the landing surface portion that is transversely oriented to the tool surface. The tool can be engaged with the landing surface portion while the landing surface portion is oriented normal to a cutting path of the tool.

The method optionally can also include additively manufacturing the body with the plug in the body. The plug can be additively manufactured to have a density that is the same as the density of a remainder of the body that does not include the plug.

The method also can include additively manufacturing the body with the plug in the body, where the plug is additively manufactured to have a density that is less than a density of a remainder of the body that does not include the plug.

In another example, a device body includes a tool surface into which a tool hole is to be cut by a tool, and a plug that is defined by one or more plug holes partially extending around the plug. The one or more plug holes extend around a landing surface portion of the tool surface. The landing surface portion is configured for the tool to engage during cutting into the tool surface.

The plug can have the landing surface portion that is coplanar with the tool surface. Alternatively, the plug can have the landing surface portion that is parallel, but not coplanar, with the tool surface. In another example, the plug can have the landing surface portion that is transversely oriented to the tool surface. Optionally, the plug can have the landing surface portion oriented normal to a cutting path of the tool.

The plug can have a density that is the same as the density of a remainder of the device body that does not include the plug. Alternatively, the plug can have a density that is less than a density of a remainder of the device body that does not include the plug.

The device body can include plural layers disposed on each other and forming the plug and the tool surface.

In another example, a device body includes a tool surface and a plug that is defined by one or more plug holes partially extending around the plug. The one or more plug holes extend around a landing surface portion of the tool surface. The plug is configured so that engagement of the landing surface portion with a tool and cutting the plug away from the body with the tool forms a tooled void in the body.

In another example, a device body includes a tool surface and a plug that is defined by one or more plug holes partially extending around the plug. The one or more plug holes extend around a landing surface portion of the tool surface. Engaging the landing surface portion with a tool to cut the plug away from the body with the tool forms a tooled void in the body.

In another example, a device body includes a tool surface, and a tooled void formed in the body. The tooled void is formed by cutting or removing material from the device body by engaging or directing a tool onto or toward a plug that is part of the device body and that is defined by one or more holes at least partially extending around a perimeter of the plug.

In another example, a device body includes a tool surface, and a plug that is defined by one or more plug holes partially extending around the plug. The one or more plug holes extend around a landing surface portion of the tool surface.

In another example, a device body includes a tool surface, and a plug that is defined by one or more plug holes partially extending around the plug. The one or more plug holes extend around a landing surface portion of the tool surface. The device body includes the tool surface, plug holes, and plug that are additively manufactured.

In another example, a system includes the device body and the tool, where the device body is positioned for being cut by the tool, and the plug has the landing surface portion oriented normal to a cutting path of the tool.

In another example, a method includes additively manufacturing a device body to have a plug partially surrounded by one or more plug holes formed into a tool surface of the body. The plug has a landing surface. The method also includes engaging a tool with the landing surface of the plug in the body, and using the tool to cut away the plug from the body and at least part of the body to form a tooled void into the body. The tool can be used to cut away the plug from the body and the at least part of body to form inner threads in the body.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    forming one or more plug holes into a tool surface of a body, the one or more plug holes formed partially around a landing surface portion of a plug in the body with the landing surface portion of the plug also located on the tool surface of the body, each of the one or more plug holes formed from two intersecting, elongated channels that extend into the body from the tool surface to an internal passage inside the body;
    wherein the one or more plug holes are formed into the body during additive manufacturing of the body;
    engaging a tool with the landing surface portion of the plug in the body; and
    using the tool to cut into the plug to cut the plug away from the body to form a tooled void into the body.

2. The method of claim 1, wherein the tool is used to cut away the plug from the body and at least part of the body to form inner threads in the body.

3. The method of claim 1, wherein using the tool to cut away the plug includes cutting into the plug with the tool before cutting away at least part of the body.

4. The method of claim 1,
    wherein the plug is additively manufactured to have a density that is the same as the density of a remainder of the body that does not include the plug.

5. The method of claim 1,
    wherein the plug is additively manufactured to have a density that is less than a density of a remainder of the body that does not include the plug.

6. The method of claim 1, wherein the one or more plug holes are formed into the tool surface of the body in one or more positions that result in the one or more plug holes forming at least part of the tooled void in the body.

7. The method of claim 1, wherein one or more plug holes are formed into the tool surface of the body around a first portion of the landing surface portion of the body,
    the first portion of the landing surface portion of the body is formed from a first material that differs from a second material from which a remainder of the body is formed, the first material having greater adhesion to the tool than the second material.

8. A method comprising:
    additively manufacturing a device body to have a plug partially surrounded by one or more plug holes formed into a tool surface of the body, the plug having a landing surface as part of the tool surface, each of the one or more plug holes formed from two intersecting, elongated channels that extend into the body from the tool surface to an internal passage inside the body;
    engaging a tool with the landing surface of the plug in the body; and
    using the tool to cut into the plug to cut the plug away from the body to form a tooled void into the body.

9. The method of claim 8, wherein the tool is used to cut away the plug from the body and the at least part of body to form inner threads in the body.

* * * * *